Patented Jan. 23, 1945

2,367,663

UNITED STATES PATENT OFFICE 2,367,663

INSULATING TAPE

Joseph N. Borglin, Wilmington, Del., assignor to Hercules Powder Company, Wilmington, Del., a corporation of Delaware No Drawing. Application August 15, 1941, Serial No. 407,099

6 Claims. (Cl. 117—122)

This invention relates to electrical insulating materials, and in particular concerns new and improved electrical insulating tapes.

Although ordinary rosin or colophony is widely used in the formulation of the plastic electrical insulating compositions with which flexible fibrous or non-fibrous sheet materials are impregnated or coated to form insulating tapes, such compositions possess certain disadvantages which are due to the inherent characteristics of the rosin used in their preparation. For example, because of the fact that ordinary rosin has an inherent tendency to oxidize or otherwise deteriorate in the air, insulating tapes comprising rosin have rather poor aging characteristics and gradually lose their desirable properties of adhesiveness and flexibility upon exposure to the air. Such tapes likewise have relatively poor water-resistance, with the result that they cannot be used in humid atmospheres without suffering a considerable loss in insulating capacity. Furthermore, the rosin tends to crystallize in the insulating composition, thereby destroying its homogeneity and further detracting from the original desirable physical and electrical properties of the tape.

It is accordingly an object of this invention to provide an electrical insulating tape which is comparatively free from the disadvantages referred to above.

Another object is to overcome these disadvantages by the use of an insulating composition comprising a rosin, or derivative thereof, having improved aging characteristics and moisture-resistance.

A further object is to provide an electrical insulating tape having improved resistance to absorption of moisture and improved aging characteristics with no material increase in cost.

Other objects will be apparent from the following detailed description of the invention, and numerous advantages not specifically referred to herein will be apparent to those skilled in the art upon employment of the invention in practice.

I have now found that these objects and attendant advantages may be realized through the use of polymerized rosin or esters thereof as the essential ingredient of the insulating composition with which the tape is impregnated or coated. More particularly, I have found that insulating tapes impregnated or coated with a composition essentially comprising polymerized rosin or an ester thereof, a wax or wax-like material, and a plasticizing agent have greater resistance to absorption of moisture and better aging characteristics than similar tapes comprising ordinary rosin.

Polymerized rosin is rosin which has been chemically treated in such manner as to polymerize certain of the constituents thereof. It is characterized by a molecular weight from about 5 to about 400 per cent greater than ordinary rosin in its pure state, and by a melting point (Hercules drop method) above about 85° C., usually above about 100° C., and in general from about 5 to about 100 degrees above that of ordinary rosin. It is further characterized by substantial freedom from substances which harden or crystallize upon standing, by an iodine value lower than that of ordinary rosin, by an acid number ranging from that of ordinary rosin down to about 100, and by high resistance to oxidation and deterioration in the air. It may be prepared from ordinary gum or wood rosin by treatment of the same with a suitable polymerization catalyst, e. g., a strong acid such as sulfuric or phosphoric acid, an amphoteric metal halide, such as aluminum chloride, zinc chloride or boron trifluoride, an acid salt such as sodium acid sulphate, etc., followed by separation of the catalyst and, if desired, refining by heat-treatment, distillation, etc. Typical methods of effecting the polymerization reaction as well as a number of suitable catalysts are disclosed in U. S. Patents 2,108,928; 2,136,525; and 2,017,866.

The properties of resistance to oxidation, aging, moisture, and crystallization are in general, roughly proportional to the degree of polymerization of the rosin, and in practice of the present invention it will usually be preferable to employ a polymerized rosin having a drop melting point of at least about 100° C. Ordinary rosin or modifications thereof may be employed in conjunction with the polymerized rosin if desired, although in such case it will be found preferable to have sufficient polymerized rosin present so that the average molecular weight of the rosin mixture is at least about 5 per cent greater than that of ordinary rosin.

As hereinbefore stated, polymerized rosin esters may likewise be employed in preparing the improved insulating tapes of the present invention. Such esters, however, vary widely in melting point according to the particular alcohol which is esterified, and hence should be selected with regard to their effect on the properties of hardness, melting point, and tackiness in the insulating composition. In general, it is preferable to employ esters having a melting point of at least 100° C., although small amounts of lower melting esters may be employed in admixture with the higher melting materials. The glycerol, ethylene glycol, pentaerythritol, and other polyhydric alcohol esters of polymerized rosin and mixtures thereof are examples of those suitable for use alone or in combination with other esters.

The proportion of polymerized rosin or esters thereof employed in the composition used in preparing the improved insulating tapes may vary widely depending upon the particular properties desired in the tape. In general, however, the polymerized rosin or its esters is employed in approximately the same proportion as the ordinary rosin heretofore employed, although, because of its property of retaining its insulating and other characteristics for long periods of time, it may be used in larger proportions if desired.

According to a preferred embodiment of the invention, the improved insulating tapes are produced by coating or impregnating a flexible fibrous or non-fibrous sheet material with a composition essentially comprising polymerized rosin or an ester thereof, a wax or wax-like material, and a plasticizing agent. If desired, other resins, such as gum accroides, copal, gum kauri, etc., may be employed in conjunction with the polymerized rosin or its esters, although such resins are preferably employed in minor proportions.

Any wax or wax-like material may be employed in preparing such preferred compositions, although those materials having high dielectric strength and good water-resistance are preferred. Examples of such materials include the vegetable and animal waxes, such as beeswax, montan wax, carnauba wax, candelilla wax, Japan wax, etc.; mineral waxes, such as paraffin and ozokerite; and synthetic waxes, such as chlorinated diphenyl, hydrogenated castor oil, etc.

The plasticizing agent is preferably an oil or oil-like material since materials of this nature have high insulating value and good moisture resistance in addition to their being excellent plasticizers of polymerized rosin. Such material may be either a vegetatble oil, such as castor oil, cottonseed oil, rapeseed oil, menhaden oil, soybean oil, peanut oil, rosin oil, etc., or a mineral oil, such as lubricating oil, refined white oil, vaseline, paraffin oil, etc. If desired, synthetic oil-like plasticizing agents, such as methyl abietate, hydrogenated methyl abietate, dibutyl phthalate, triphenyl phosphate, glycerine tripropionate, etc., may likewise be employed.

The polymerized rosin or polymerized rosin ester, wax or wax-like material, and plasticizing agent ingredients of the preferred insulating compositions may be employed in widely varying proportions depending upon the particular characteristics desired. Thus, for example, compositions which are soft and highly tacky at ordinary atmospheric temperatures will contain a relatively large proportion of the plasticizing agent, whereas compositions which are to be subjected to higher temperatures preferably contain a larger proportion of the polymerized rosin or wax. In general, however, the polymerized rosin, or ester thereof, is present in an amount representing between about 20 to about 65, preferably from about 25 to about 55, per cent by weight of the entire composition; the wax or wax-like material in an amount representing from about 30 to about 70, preferably from about 35 to about 55, per cent by weight; and the plasticizing agent in an amount representing between about 0.5 to about 35 per cent by weight.

Such compositions may be applied to any type of tape backing, e. g., a fibrous sheet material such as cloth or paper, or a non-fibrous sheet material such as regenerated cellulose, etc., to form the tapes provided by the invention. According to a preferred mode of operation, an impregnating bath of the insulating composition is prepared by thoroughly mixing the polymerized rosin and wax in molten form, e. g., at a temperature of 125°–220° C., and thereafter adding the plasticizing agent. The tape is then immersed in the composition for such time as is necessary to secure thorough impregnation, after which it is allowed to drain and cool to room temperature before storing for future use. Such process may be carried out continuously employing any of the various known types of continuous impregnating machines. Alternatively, the composition may be applied to the tape as a surface coating, either by hot-melt coating methods, wherein the composition in molten or highly plastic form is spread on the tape with a doctor blade or a roller coater, or by solution coating methods, wherein the composition is applied in the form of a solution in a volatile solvent such as benzene.

Regardless of their exact method of manufacture, the present insulating tapes take fullest advantage of the excellent insulating and adhesive properties of the polymerized rosin or polymerized rosin esters. Moreover, in cases where the fibrous backing is a material such as cotton, it has been found that the backing itself shows very little tendency to weaken with age. This has constituted a serious disadvantage in tapes comprising compositions containing substantial proportions of ordinary rosin, and is believed to be due to the deleterious effect of the oxidation breakdown products of the rosin on the fibrous backing.

The following examples will illustrate several ways in which the principle of the invention has been applied but are not to be construed as limiting the same.

*Example I*

Approximately 100 parts by weight of I wood rosin were polymerized by dissolving in about 200 parts by weight of benzene, and thereafter treating the resulting solution over a period of about one hour with about 75 parts by weight of 95 per cent sulfuric acid while maintaining a temperature of about 15° C. The mixture was then allowed to stand for about 15 minutes after which the benzene solution was decanted from the sludge, and was washed with water to remove traces of free acid. Upon evaporation of the benzene solvent there was obtained a polymerized rosin having a drop melting point of about 100° C., an acid number of about 155, and a color of M on the rosin color scale.

Approximately 50 parts by weight of this polymerized rosin and 40 parts by weight of beeswax were melted and mixed by stirring at a temperature of about 145°–155° C. for a period of 30 minutes, after which there was added 10 parts by weight of castor oil. Upon cooling, the composition so prepared was a waxy solid having good tack and adhesion, and a penetration hardness value of about 42 at 90° F. A cotton tape which had been impregnated with this composition at a temperature of about 160° C. had excellent insulating characteristics, good resistance to moisture, and retained its adhesiveness over a much longer period of time than a similar tape comprising ordinary rosin.

Example II

Approximately 32 parts by weight of the polymerized rosin described in Example I and 40 parts by weight of montan wax were melted and stirred together, after which there was added 28 parts by weight of castor oil. The composition so prepared was considerably softer and more tacky than that described in Example I, having a penetration hardness value of 72 at 90° F. A tape impregnated therewith had excellent adhesive properties at relatively low temperatures.

Example III

Approximately 50 parts by weight of the polymerized rosin described in Example I was melted and mixed with 40 parts of montan wax and 10 parts of rapeseed oil. A cambric tape impregnated with the resulting composition had good insulating properties and retained its excellent low-temperature adhesive qualities over long periods of time.

Example IV

A composition prepared as in Example I and consisting of 50 parts by weight of polymerized rosin, 40 parts by weight of carnauba wax, and 10 parts by weight of peanut oil was a hard wax-like material having a penetration hardness value of about 85. A cotton tape impregnated with this composition had good adhesive properties at relatively high temperatures.

Example V

A cotton tape which had been impregnated with a composition consisting of 20 parts by weight of polymerized rosin, 16 parts by weight of paraffin wax, and 4 parts by weight of corn oil had good tack at relatively low temperatures and did not lose its initial insulating and adhesive qualities upon long standing in the air.

All of the tapes prepared in the foregoing examples were further characterized by excellent insulating properties under humid conditions, i. e., good moisture resistance, and by retaining their adhesive properties at higher temperatures than similar tapes in which ordinary rosin was employed.

Other modes of applying the principle of my invention may be employed instead of those explained, change being made as regards the methods or ingredients employed, provided the product stated by any of the following claims, or the equivalent of such stated product, be obtained.

This application is a continuation-in-part of my copending application, Serial No. 389,179, filed April 18, 1941.

What I claim and desire to protect by Letters Patent is:

1. An electrical insulating tape comprising a fabric backing supporting an adhesive insulating composition consisting of from about 20 to about 65 per cent by weight of polymerized rosin, from about 30 to about 70 per cent by weight of a wax-like material, and from about 0.5 to about 35 per cent by weight of a plasticizing agent for the polymerized rosin characterized by high insulating value and good moisture resistance.

2. An electrical insulating tape comprising a fabric backing impregnated with an adhesive insulating composition comprising from about 20 to about 65 per cent by weight of polymerized rosin, from about 30 to about 70 per cent by weight of a wax-like material, and from about 0.5 to about 35 per cent by weight of a plasticizing agent for the polymerized rosin characterized by high insulating value and good moisture resistance.

3. An electrical insulating tape comprising a fabric backing supporting an adhesive insulating composition comprising from about 20 to about 65 per cent by weight of a material selected from the group consisting of polymerized rosin and polymerized rosin esters, from about 30 to about 70 per cent by weight of a wax-like material, and from about 0.5 to about 35 per cent by weight of a plasticizing agent for the polymerized rosin characterized by high insulating value and good moisture resistance.

4. An electrical insulating tape comprising a fabric backing impregnated with an adhesive insulating composition comprising from about 20 to about 65 per cent by weight of polymerized rosin, from about 30 to about 70 per cent by weight of a wax, and from about 0.5 to about 35 per cent by weight of castor oil.

5. An electrical insulating tape comprising a fabric backing impregnated with an adhesive insulating composition comprising from about 20 to about 65 per cent by weight of polymerized rosin, and from about 30 to about 70 per cent by weight of a wax, and from about 0.5 to about 35 per cent by weight of a mineral oil.

6. An electrical insulating tape comprising a fabric backing supporting an adhesive insulating composition comprising from about 20 to about 65 per cent by weight of a material selected from the group consisting of polymerized rosin and polymerized rosin esters, from about 30 to about 70 per cent by weight of a wax-like material, from about 0.5 to about 35 per cent by weight of a plasticizing agent for the polymerized rosin characterized by high insulating value and good moisture resistance, and another resin compatible with the rosin material.

JOSEPH N. BORGLIN.